United States Patent [19]

Hanyu et al.

[11] Patent Number: 5,054,890
[45] Date of Patent: Oct. 8, 1991

[54] LIQUID CRYSTAL DEVICE

[75] Inventors: Yukio Hanyu, Atsugi; Osamu Taniguchi, Chigasaki; Toshiharu Uchimi, Atsugi; Masanobu Asaoka, Yokohama, all of Japan

[73] Assignee: Canon Kabushiki Kaisha, Tokyo, Japan

[21] Appl. No.: 369,857

[22] Filed: Jun. 22, 1989

[30] Foreign Application Priority Data

Jun. 23, 1988 [JP] Japan ................................ 63-155453
May 12, 1989 [JP] Japan ................................ 1-120044

[51] Int. Cl.$^5$ .............................................. G02F 1/133
[52] U.S. Cl. ..................................... 350/344; 350/343; 350/350 S
[58] Field of Search ............. 350/344, 343, 334, 350 S

[56] References Cited

U.S. PATENT DOCUMENTS

| 4,362,771 | 12/1982 | Umeda et al. | 350/344 |
|---|---|---|---|
| 4,390,245 | 6/1983 | Shimizu et al. | 350/344 |
| 4,917,473 | 4/1990 | Watanabe | 350/341 |
| 4,973,138 | 11/1990 | Yamazaki et al. | 350/344 |
| 4,983,429 | 1/1991 | Takayanagi et al. | 350/344 |

FOREIGN PATENT DOCUMENTS

| 0258848 | 3/1988 | European Pat. Off. | 350/344 |
|---|---|---|---|
| 0260022 | 12/1985 | Japan | 350/344 |
| 0067830 | 4/1986 | Japan | 350/344 |

Primary Examiner—Rolf Hille
Assistant Examiner—Tan Ho
Attorney, Agent, or Firm—Fitzpatrick, Cella, Harper & Scinto

[57] ABSTRACT

A liquid crystal device includes: a pair of substrates disposed spaced apart from each other, a liquid crystal disposed between the substrates and a plurality of adhesive members bonding the substrates. The adhesive members are dispersed along the inner surfaces of the substrates at a rate of 100 members/mm$^2$ or less with an average adhesion area per member of $1.25 \times 10^{-3}$ mm$^2$ or less so as to satisfy the relationship of:

$$S_A/S_B = 2.5 \times 10^{-2} - 1.0\%,$$

wherein $S_A$ denotes the total area of adhesion given by the adhesive members and $S_B$ denotes the area of display given by the liquid crystal device. Spacer members may be further disposed between the substrates. The spacer members may preferably be in the form of rods having a length in the range of 1 to 25 μm.

11 Claims, 5 Drawing Sheets

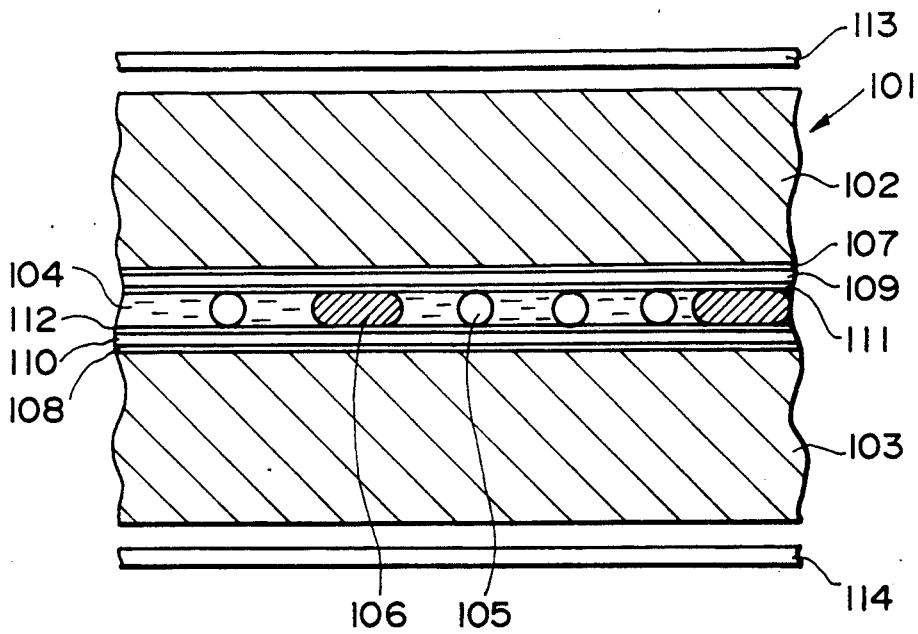
FIG. IA
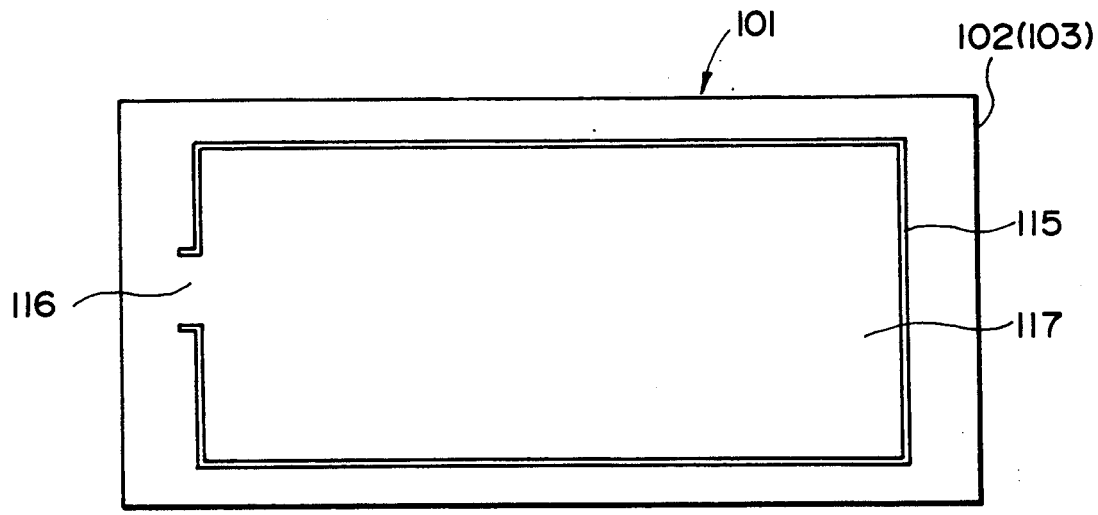
FIG. IB

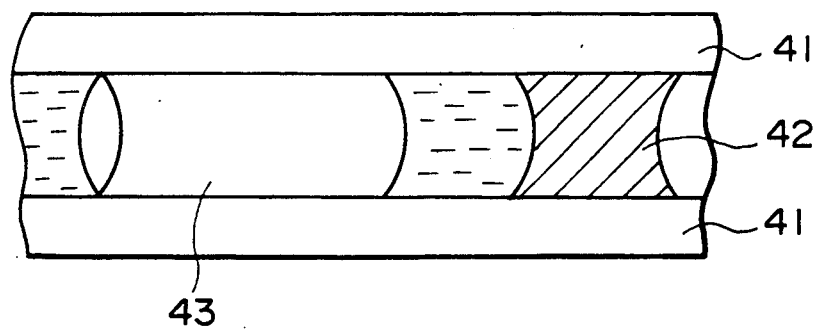
F I G. 4
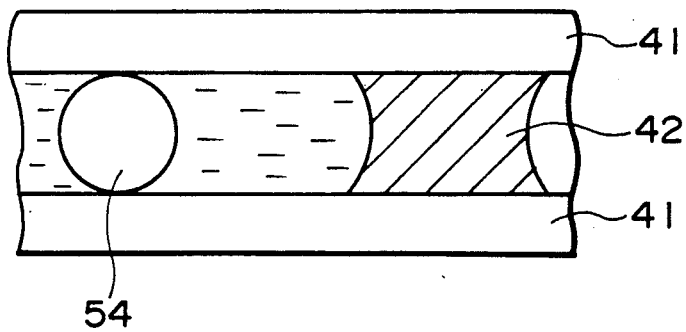
F I G. 5
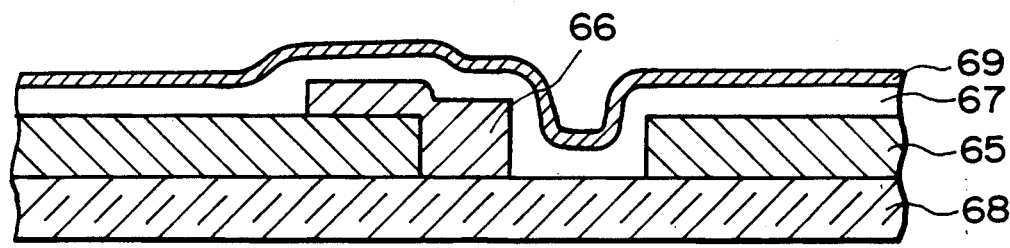
F I G. 6

LIQUID CRYSTAL DEVICE

FIELD OF THE INVENTION AND RELATED ART

The present invention relates to a liquid device for use in a liquid crystal display device, a liquid crystal-optical shutter, etc., particularly such a liquid crystal device using a ferroelectric liquid crystal, more particularly a ferroelectric liquid crystal device excellent in durability against a mechanical shock, etc.

A display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107217/1981, U.S. Pat. No. 4,367,924). The ferroelectric liquid crystal generally has chiral smectic C phase (SmC*) or H phase (SmH*), in which it is provided with a bistable orientation or alignment state where the liquid crystal molecules assume either one of a first optically stable state and a second optically stable state in response to an applied electric field, shows a memory characteristic of retaining the resultant state in the absence of an electric field, and also shows a high-speed response to a change in electric field, so that the ferroelectric liquid crystal is expected to be widely utilized in a high speed and memory type optical modulation device.

In such a display device, a method of dispersing spacers, such as silica beads or alumina beads, in the device has generally been adopted in order to maintain a sufficiently small spacing between two substrates. Mere maintenance of a constant spacing between the two substrates is, however, not sufficient particularly in order to prevent the occurrence of destruction or disorder of an alignment caused by a mechanical shock or impact.

In order to solve the above problem, it has been prosed to disperse adhesive particles in a device so as to suppress slip or positional deviation between the substrates, e.g., in Japanese Laid-Open Patent Application (Kokai) No. 174726/1987. With respect to the alignment of a liquid crystal, however, the presence of spacer members, adhesive particles, etc., in a device is liable to cause alignment defects around them.

In case where a liquid crystal device in such a state is driven for switching from a first optically stable state to a second optically stable state, the switching is delayed around the spacer members and adhesive particles to cause a phenomenon of flickering. Further, if the delay is extensive, a phenomenon of persistence that a picture state before the switching remains after the switching to be observable. This phenomenon becomes remarkable as the number of the spacer members or adhesive particles and is problematic because it noticeably degrade the image quality of the liquid crystal device.

Further, according to our experiments, there has been observed a problem. More specifically, when a cell as described above comprising a pair of substrates fixed to each other with adhesive members is filled with a ferroelectric liquid crystal material in isotropic phase, followed by cooling to chiral smectic phase, to form a liquid crystal cell, and the cell is observed through cross-nicol polarizers sandwiching the cell, zigzag or wavelike lines are recognized on the cell face by naked eyes. The zigzag or wavelike lines causes a lowering in display quality.

Such zigzag or wavelike lines are caused when a liquid crystal is injected to fill a cell in isotropic or cholesteric phase and then cooled to cause a volumetric contraction during a phase transition into smectic A phase or chiral smectic phase, whereby microscopic spaces in the form of zigzag or wavelike lines are retained in the chiral smectic liquid crystal and are observable through cross nicol polarizers.

SUMMARY OF THE INVENTION

An object of the present invention is to provide a ferroelectric liquid crystal device having solved the above-mentioned prolbmes.

Another object of the present invention is to provide a ferroelectric liquid crystal device which has been improved in both impact resistance and display quality.

As a result of our repetitive experiments for accomplishing the above-mentioned objects, we have discovered a correlation between the occurrence of the above-mentioned zigzag or wavelike lines and the distribution of adhesive members, to thereby arrive at the present invention.

Thus, according to an aspect of the present invention, there is provided a liquid crystal device, comprising: a pair of substrates disposed spaced apart from each other, a liquid crystal disposed between the substrates and a plurality of adhesive members bonding the substrates; the adhesive members being dispersed along the inner surfaces of the substrates at a rate of 100 members/mm$^2$ or less with an average adhesion area per member of $1.25 \times 10^{-3}$ mm$^2$ or less so as to satisfy the relationship of:

$$S_A/S_B = 2.5 \times 10^{-2} - 1.0\%,$$

wherein $S_A$ denotes the total area of adhesion given by the adhesive members and $S_B$ denotes the area of display given by the liquid crystal device.

According to another aspect of the present invention, there is provided a liquid crystal device, comprising: a pair of paralled electrode plates, and a ferroelectric liquid crystal, adhesive particles and spacer members disposed between the electrode plates; said spacers being in the form of rods having a length of 1-25 μm and dispersed at a rate of 5-100 spacers/mm$^2$.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1A is a partial schematic sectional view across the thickness of a ferroelectric liquid crystal device according to the present invention. FIG. 1B is a schematic plan view thereof.

FIG. 4 is a partial sectional view of a liquid crystal device using rod spacers.

FIG. 5 is a partial sectional view of a liquid crystal device using bead spacers.

FIG. 6 is a partial sectional view across the thickness of a substrate of a liquid crystal device used in an Example.

DETAILED DESCRIPTION OF PREFERRED EMBODIMENTS

Figure 2:
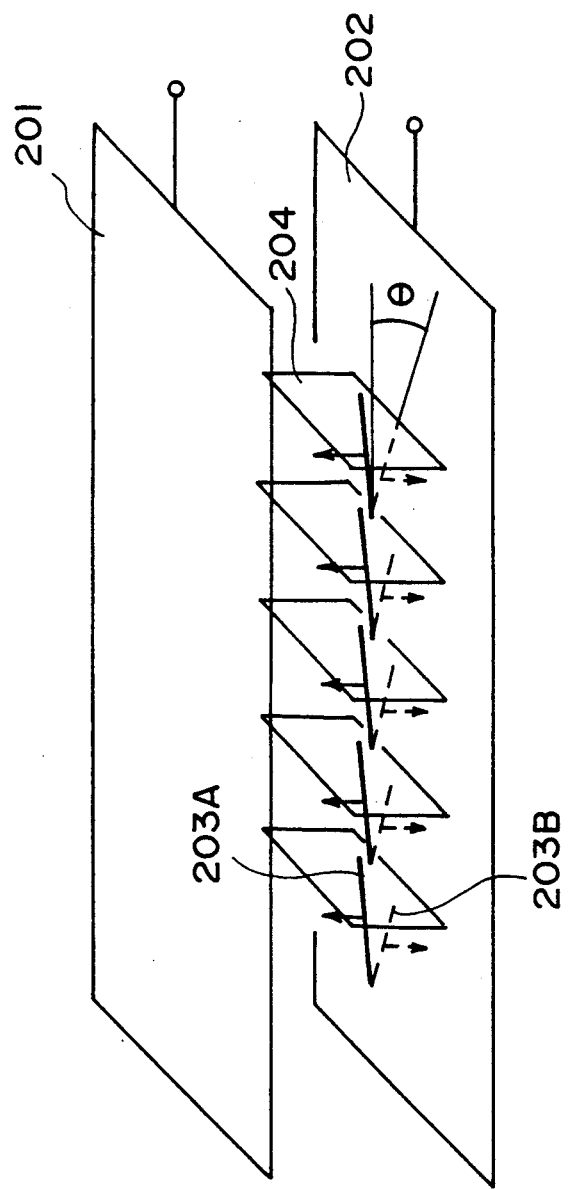
FIG. 2 is a schematic perspective illustration showing an alignment state of ferroelectric liquid crystal molecules used in the present invention.

FIG. 1A is a partial sectional view of a ferroelectric liquid crystal cell 101 of the present invention. The ferroelectric liquid crystal cell 101 comprises a pair of substrates 102 and 103 of glass, plastic, etc., and therebetween a ferroelectric liquid crystal 104, rigid numbers 105 of glass fiber, alumina beads, silica beads, etc., functioning as spacers, and adhesive members 106 bonding the substrates 102 and 103.

On the inner sides of the substrates 102 and 103 are respectively disposed transparent electrodes 107 and 108, transparent dielectric films 109 and 110, and alignment control films 111 and 112. It is possible to omit one of the alignment control films 111 and 112.

The ferroelectric liquid crystal 104 may be selected from liquid crystals disclosed in, e.g., U.S. Pat. Nos. 4,561,726, 4,589,996, 4,592,858 and 4,614,609. The ferroelectric liquid crystal may be in an alignment state wherein its helical structure is suppressed or released as disclosed in U.S. Pat. Nos. 4,563,059 and 4,712,873.

FIG. 2 illustrates a bistable alignment or orientation state wherein a helical alignment structure inherently owned by a chiral smectic liquid crystal in its bulk phase has been released. Such a bistable alignment state may be realized by holding the spacing between the pair of substrates 201 and 202 to a value (of 10 $\mu$m or less) sufficiently small to release the helical alignment structure. In the bistable alignment state, a liquid crystal molecule in the absence of an electric field is held as a liquid crystal molecule 203A or 203B which has been oriented to either one stable state so as to have a dipole moment indicated by an arrow. Further, in the present invention, it is possible to use an alignment state wherein a liquid crystal molecule is oriented to have a pre-tilt angle with respect to the substrates 201 and 202. The liquid crystal molecules are aligned to form vertical molecular layers 201 each composed of a plurality of liquid crystal molecules.

The adhesive members 106 used in the present invention may for example be formed by preliminarily dispersing adhesive expoxy resin particles with a diameter of 1-50 $\mu$m on either one substrate and, superposing the two substrates, which are then subjected to a heating treatment. The rigid members 105 may preferably be dispersed on a substrate in advance together with the adhesive epoxy resin particles. The rigid members 105 function as spacers to hold a spacing between the substrates 102 and 103 and may generally have a diameter in the range of 1-10 $\mu$m.

The orientation states in such a ferroelectric liquid crystal cell 101 may be optically discriminated by means of a pair of polarizers 113 and 114.

FIG. 1B is a schematic plan view of such a ferroelectric liquid crystal cell 101, wherein a sealing member 115 is disposed so as to seal the periphery of the cell by fastening the substrates 102 and 103 except for an injection port. An area 117 inside the sealing member 115 is used as a display area.

The alignment control films 111 and 112 may be formed of a film of an organic insulating material, such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin, and acrylic resin, which has been imparted with a uniaxial aligning treatment, such as rubbing. The transparent dielectric films 109 and 110 may be formed of a film of an inorganic insulating material, such as silicon monoxide, silicon dioxide, aluminum oxide, zirconia, magnesium fluoride, cerium oxide, cerium fluoride, silicon nitride, silicon carbide and boron nitride. The alignment control films 111 and 112 may generally have a thickness of 50 Å–1000 Å, and the transparent dielectric films 109 and 110 may generally have a thickness of 100 Å–3,000 Å.

FIG. 4 is a schematic partial illustration in section of a liquid crystal device using a rod spacer, which comprises substrates (electrode plates) 41, an adhesive particle 42 and a rod spacer 43. On the other hand, FIG. 5 is a schematic partial illustration of a liquid crystal device using a bead spacer 54.

In case where a bead spacer 54 is used, the spacer member 54 contacts an electrode plate 41 at a point as shown in FIG. 5. On the other hand, in case where a rod spacer 43 is used, the spacer member 43 contacts an electrode plate 41 in a line as shown in FIG. 4, so that a larger supporting force is attained by a single spacer member 43. Correspondingly, bead spacers 54 are required to be used at a density of 200 spacers/mm$^2$ or more in order to hold a stable spacing between the substrates. In contrast thereto, rod spacers 43 can sufficiently retain a spacing between the substrates if they are used in a density of 50 spacers/mm or more (for a length of 2 $\mu$m). As a result, the number of spacer members used in a device can be remarkably decreased, so that the cell wall can be retained with suppression of alignment defects to obtain a better image quality while not changing the number of adhesive particles, i.e., while retaining a required impact durability.

The rod spacers 43 may be generally composed of glass but can be formed from a polymer. Examples of such a polymer may include acetal resin, chlorinated polyether, epoxy resin, fluorine-containing resin, phenolic resin, polyaryl ether, polycarbonate, polyaryl sulfone, polyphenylene oxide, polysulfone, polyether sulfone, polystyrene, polyarylate, urea resin, melamine resin, furan resin, polyamide, polyamide-imide, polybutadiene, polyaminobismaleimide, polypropylene, polyphenylene sulfide, and polyphenylene sulfone.

The diameter of the rod spacers 43 determines the spacing between the substrates of the liquid crystal device and affects the performances of the device. A smaller spacing is preferred in order to provide a better bistable alignment state and retain a memory characteristic. Accordingly, the rod spacers may preferably have a diameter of 1 $\mu$m–20 $\mu$m, more preferably 1-5 $\mu$m. As the rod spacers become longer, one spacer can contact a substrate at a larger length, so that the number of spacers can be decreased accordingly. If a spacer member 43 is excessively long, however, a larger alignment defect is caused therefrom to exceed the effect of improved image quality attributable to the decrease in number of spacers and provide an even worse image quality. With the above factors in view, the spacer members may preferably have a length of 1.0-25 $\mu$m. Further, the adhesive particles may preferably be one providing an average adhesion area per particle of $1.25 \times 10^{-3}$ mm or less and may preferably be used in a density satisfying the relationship of $S_A/S_B = 2.5 \times 10^{-2}$ to 1.0%, wherein $S_A$ denotes the total area of adhesion given by the adhesive members and $S_B$ denotes the area of display given by the liquid crystal device.

Hereinbelow, the present invention will be explained based on specific Examples and Comparative Examples.

EXAMPLE 1

Two 1.1 mm-thick glass plates were provided and were respectively coated with transparent stripe electrodes of ITO (indium-tin-oxide) and then with a 1000 Å-thick transparent dielectric film of $SiO_2$ by sputtering.

The $SiO_2$ film was further coated with a 500 Å-thick polyimide alignment control film by applying a 4 wt.% solution of a polyimide-forming liquid ("SP-710" available from Toray K.K.) in a mixture solvent of N-methylpyrrolidone/n-butyl cellosolve (2/1) according to a printing process, followed by heat-curing at 300° C. The film after the curing was rubbed with an acetate fiber-planted cloth.

On one of the two substrates treated in the manner described above, epoxy resin adhesive particles (trade name: Toraypearl available from Toray K. K.) having an average particle size of 5 μm were dispersed at a dispersion density of 30 particles/mm² by means of a Nordson electrostatic dispersion system. Separately, on the other substrate, silica micro-beads having an average diameter of 1.5 μm were dispersed at a dispersion density of 200 beads/mm². Then, a liquid adhesive (trade name: Struct Bond, available from Mitsui Toatsu K. K.) was applied in a thickness of 4 μm as a sealing member 115. Then, the two glass substrates were superposed with each other and bonded to each other by applying to them a pressure of 4 kg/cm² at a temperature of 70° C. for 5 minutes, followed by application of a pressure of 1 kg/cm² at 150° C. to heat-cure the two types of adhesiveness, whereby a blank cell was prepared. At this time, the adhesive particles provided an average adhesion area of $5 \times 10^{-5}$ mm²/particle, and a ratio $S_A/S_B$ of $15 \times 10^{-2}$%.

Then, the blank cell was evacuated to a pressure of $10^{-4}$ Torr and filled with a ferroelectric liquid crystal ("CS 1014" (trade name) available from Chisso K. K.) in isotropic phase at 90° C., which was then cooled through cholesteric phase and smectic A phase to 25° C. yielding chiral smectic phase. The liquid crystal cell thus prepared was subjected to an impact durability test by means of a dropping durability tester ("DT-50", available from Yoshida Seiki K. K.) wherein the dropping impact was started from 20 G and increased by a unit increment of 10 G. As a result, the liquid crystal device prepared above caused no deterioration in alignment even at a dropping impact of 80 G.

EXAMPLES 2-9

Liquid crystal devices were prepared in the same manner as in Example 1 except that a UV (ultraviolet)-curable adhesive ("XLC-1" (trade name), available from Kyoritsu Kagaku K. K.) was applied instead of the adhesive particles by letterpress printing in spots each with a thickness of 3 μm and a diameter in the range of 5.5-28 μm at varying distribution densities as shown in Table 1 below, the same UV-curable adhesive was also printed in a thickness of 4 μm as a sealing member, and pairs of substrates were superposed and bonded to each other by UV irradiation.

The liquid crystal devices thus prepared were subjected to the same impact durability test as in Example 1. As a result, no devices caused a deterioration in alignment at a dropping impact of 80 G.

Further, no devices showed a poor injection or injection failure of liquid crystal over the entire display area.

TABLE 1

| Example | Average adhesion area (1 spot) | Dispersion density (spots/mm²) | $\frac{S_A}{S_B} \times 100\%$ |
|---------|-------------------------------|-------------------------------|-------------------------------|
| 2 | $1.25 \times 10^{-3}$ mm² | 5/mm² | $62.5 \times 10^{-2}$% |
| 3 | $1.25 \times 10^{-3}$ mm² | 1/mm² | $12.5 \times 10^{-2}$% |
| 4 | $5 \times 10^{-5}$ mm² | 10/mm² | $5.0 \times 10^{-2}$% |
| 5 | $5 \times 10^{-5}$ mm² | 40/mm² | $20.0 \times 10^{-2}$% |
| 6 | $5 \times 10^{-5}$ mm² | 80/mm² | $40.0 \times 10^{-2}$% |
| 7 | $2.5 \times 10^{-4}$ mm² | 10/mm² | $25.0 \times 10^{-2}$% |
| 8 | $2.5 \times 10^{-4}$ mm² | 30/mm² | $75.0 \times 10^{-2}$% |
| 9 | $2.5 \times 10^{-4}$ mm² | 5/mm² | $12.5 \times 10^{-2}$% |

COMPARATIVE EXAMPLES 1-4

Ferroelectric liquid crystal devices were prepared in the same manner as in Example 1 except that the average adhesion area per unit particle and dispersion density of adhesive particles were changed as shown in the following Table 2, and subjected to the impact durability test in the same manner as in Example 1.

The results are also shown Table 2 below together with evaluation of injection of liquid crystal in the respective devices.

TABLE 2

| | Average adhesion area (1 spot) | Dispersion density (spots/mm²) | $\frac{S_A}{S_B} \times 100\%$ | Injection of liquid crystal | Impact durability |
|---|---|---|---|---|---|
| Comp. Ex. 1 | $5 \times 10^{-5}$ mm² | 120/mm² | $60.0 \times 10^{-2}$% | Poor injection*¹ | No deterioration at 80 G. |
| 2 | $2 \times 10^{-4}$ mm² | 60/mm² | 1.2% | Poor injection*¹ | No deterioration at 80 G. |
| 3 | $5 \times 10^{-5}$ mm² | 4/mm² | $2.0 \times 10^{-2}$% | Satisfactory injection*² | Alignment deterioration at 40 G.*³ |
| 4 | $2 \times 10^{-4}$ mm² | 1/mm² | $2.0 \times 10^{-2}$% | Satisfactory Injection*² | Alignment deterioration at 40 G.*³ |
| 5 | $1.25 \times 10^{-3}$ mm² | 12/mm² | $1.5 \times 10^{-2}$% | Poor injection*¹ | No deterioration at 80 G. |

*¹Injection failure was caused at about 3% of the display area.
*²No injection failure was observed over the entire display area.
*³After the impact test, a sanded texture was developed.

The liquid crystal cells prepared in the above-mentioned Examples 1-10 and Comparative Examples 1-5 were respectively sandwiched between a pair of cross nicol polarizers and observed by naked eyes. As a result, a large number of black zigzag or wavelike lines were clearly, observed by naked eyes in the cells of Comparative Examples 1-5, whereas no such black defective lines were observed in any cells of Examples 1-10.

Figure 3:
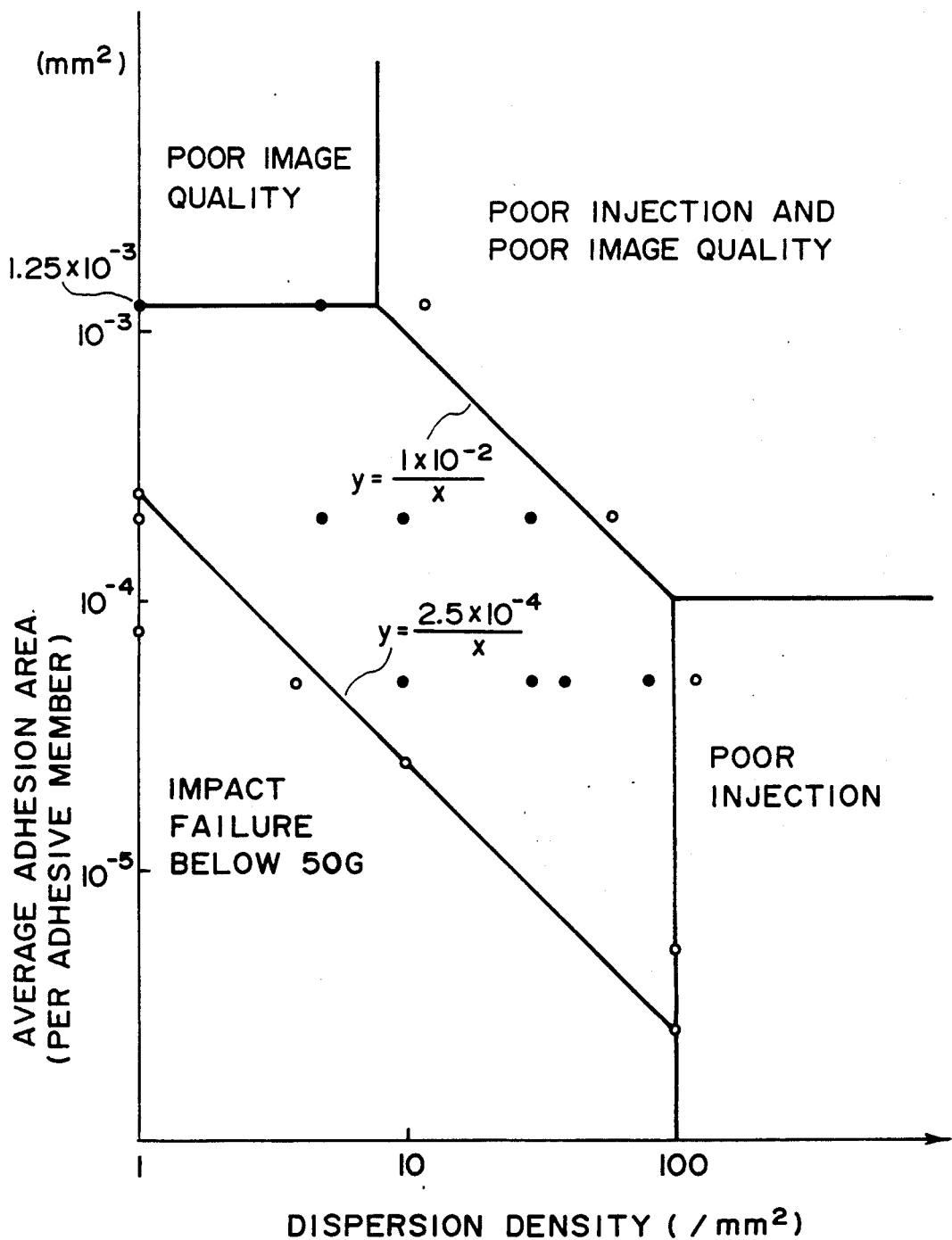
FIG. 3 is a diagram showing a correlation between the performances of a device and the average adhesion area for an adhesive member and distribution density thereof.

FIG. 3 is a diagram prepared based on the experimental results including those of the above Examples 1-10 and Comparative Examples 1-5. In FIG. 3, and represent the measured values wherein represents the results obtained by Examples and represents the results obtained by Comparative Examples. Further, in FIG. 3, the indication of "poor image quality" refers to a region where the above-mentioned black zigzag or wavelike lines occurred and "poor injection" refers to a region where an injection failure of failing to completely fill a cell was observed.

In the above-mentioned embodiment of the present invention, the average adhesion area (y) per member of adhesive particles 106 may be set to $1.25 \times 10^{-3}$ mm² or less, the distribution density (x) thereof to 100 members/mm² or less, and the product of $x \times y$, i.e., the ratio ($S_A/S_B$) of the total adhesion area $S_A$ (mm²) to the display area $S_B$ (mm²) to $2.5 \times 10^{-2}$ to 1.0%. In a particularly preferred embodiment, the distribution density of the adhesive members 106 may be set to 50 members/mm² or less.

Incidentally, the average adhesion area is an average of measured values for about 200 adhesive members, and the distribution density of the adhesive members is an average of measured values at 200 points (ten points each from 5×4 checkers formed on the display area) each in an area of 1.08 mm².

As described above, according to the present invention, the occurrence of sanded texture due to impact can be prevented while preventing injection failure of liquid crystal and also occurrence of black zigzag or wavelike lines leading to a lowering in display quality.

EXAMPLE 11

Two 0.7 mm-thick glass plates were provided, and as shown in FIG. 6, each of the plates 68 was coated with 1500 Å-thick stripe electrodes 65 of ITO and further with a 1000 Å-thick molybdenum method electrode 66 as a low-resistivity lead line so as to stride over the ITO electrode and the bare substrate portion. Further, a 500 Å-thick SiO₂ layer 67 was formed thereon by sputtering as a layer for preventing short circuit between the upper and lower electrodes, and was further coated with a 200 Å-thick polyimide alignment film 69 formed by applying a 2% solution of a polyimide-forming solution ("SP-710" available from Toray K.K.) in a mixture solvent of N-methylpyrrolidone/n-butyl cellosolve (=2/1) by means of a spinner rotating at 3000 r.p.m. for 30 seconds, following by about 1 hour of heat-curing at 300° C. The polyimide film after the curing was subjected to rubbing.

On one of the two glass substrates treated in the above described manner, rod spacers having a diameter of about 1.7 μm and a length of 2 μm (available from Nippon Denki Garasu K.K.) were dispersed at a density of 80 spacers/mm². On the other substrate were dispersed adhesive particles having an average size of 5 μm ("Toraypearl" available from Toray K.K.) at a density of 50 particles/mm². The two substrates were superposed and bonded to each other so that their stripe electrodes crossed each other and their rubbing directions were parallel to each other to form a blank cell. At this time, the adhesive particles provided an average adhesion area per particle of $5 \times 10^{-5}$ mm².

Into the cell, a chiral smectic liquid crystal "CS-1014" (available from Chisso K.K.) in isotropic phase was injected under vacuum and, after seating, aligned by cooling from isotropic phase at a rate of 0.5° C./hr. Experiments described hereinafter were further performed at 25° C.

The liquid crystal "CS-1014" showed the following phase transition series.

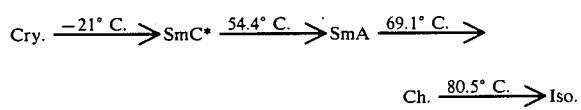

Cry.: crystal
SmC*: chiral smectic C phase
SmA: smectic A phase
Ch.: cholesteric phase
Iso.: isotropic phase

EXAMPLE 12

A liquid crystal cell was prepared in the same manner as in Example 11 except that a liquid crystal ("CS-1011" available from Chisso K.K.) showing the following phase transition series was used.

EXAMPLE 13

A liquid crystal cell was prepared in the same manner as in Example 11 except that rod spacers having a length of 3 μm were dispersed at a rate of 50 spacers/mm².

COMPARATIVE EXAMPLE 6

A liquid crystal cell was prepared in the same manner as in Example 11 except that bead spacers having a diameter of 1.6 μm were dispersed at a rate of 250 spacers/mm².

COMPARATIVE EXAMPLE 7

A liquid crystal cell was prepared in the same manner as in Example 11 except that bead spacers having a diameter of 1.6 μm were dispersed at a rate of 80 spacers/mm².

The liquid crystal cells prepared in the above Examples 11-13 and Comparative Examples 6 and 7 were evaluated in the following manner.

The uniformity of the cell gap or spacing was evaluated by a Berek compensator (measurement by a phase difference).

Figure 7A:
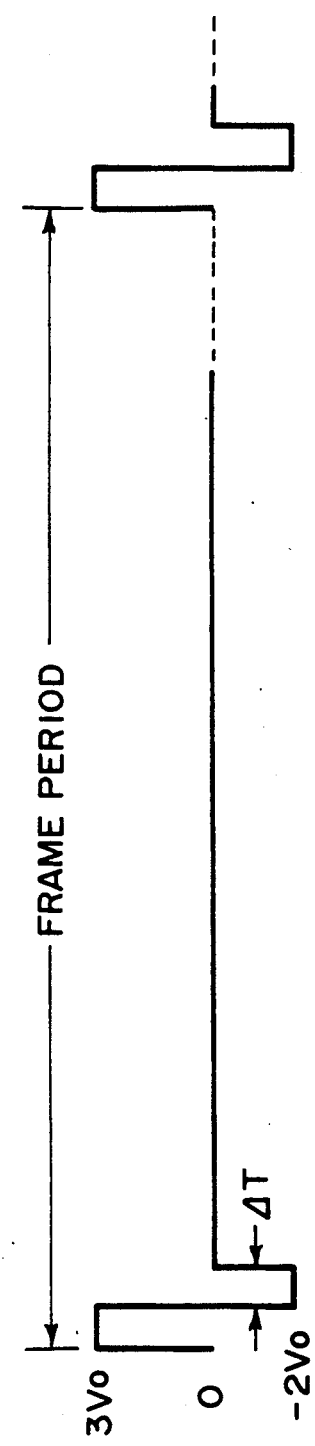
FIG. 7 is a diagram showing driving waveforms used in the Example.
Figure 7B:
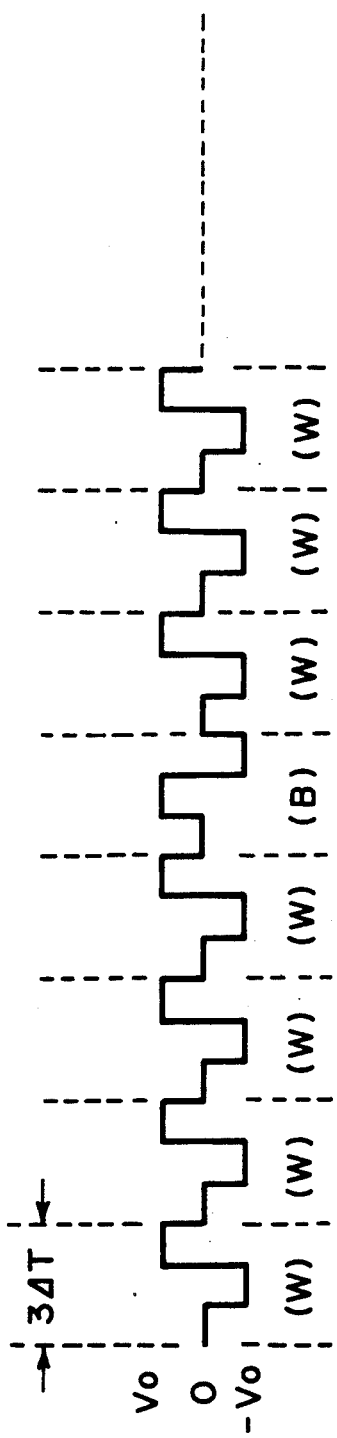
Figure 7C:
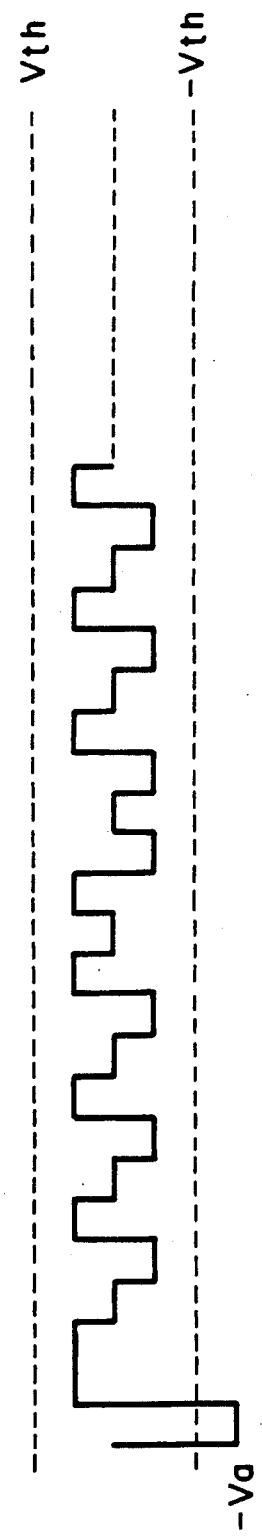

The image quality was evaluated by subjecting each liquid crystal cell to writing according to the driving scheme shown in FIG. 7 ($\Delta T = 50$ μsec, $V_0 = 10$ volts).

According to the driving scheme, a bright state and a dark state were written in one frame, and one-scanning period of $3\Delta T$ was used with respect to a writing pulse duration of $\Delta T$. Referring to FIG. 7, at (A) is shown a scanning signal applied to an n-th scanning line Sn; at (B) are shown data signals applied to a data line I for providing a sequence of W (white)→W→W→W→B (black)→W→W→W; and at (C) is shown a synthetic voltage waveform applied to a pixel formed at the intersection of the scanning line Sn and the data line I.

Each liquid crystal device driven in the above described manner was observed through right angle cross nicol polarizers.

The results of the above evaluation are shown in the following Table 3.

TABLE 3

|  | Image quality | Uniformity of gap |
|---|---|---|
| Example 11 | O | O |
| 12 | O | O |
| 13 | O | O |
| Com. Ex. 6 | Δ | O |
| 7 | O | x |

The standards of the evaluation were as follows.

Image quality

O: No problem with respect to either flickering or persistence
Δ: Somewhat noticeable
x: Excessively noticeable Uniformity of cell gap O: Uniform over the entire area
Δ: Partial irregularity was observed
x: Iregularity was observed over the entire area.

The above results show that the change of spacers from beads to rods could decrease the number of spacers to provide a better image quality while uniformly retaining a gap between two electrode plates.

Thus, there has been provided a liquid crystal device which has a uniform spacing between two electrode plates, has a sufficient durability against a mechanical impact and also has a good alignment characteristic to provide images with good image quality.

What is claimed is:

1. A ferroelectric liquid crystal device, comprising:
a pair of substrates disposed spaced apart from each other,
a ferroelectric liquid crystal disposed between the substrates, and
a plurality of adhesive members bonding the substrates, wherein:
the adhesive members are dispersed along the inner surfaces of the substrates at a rate of at most 100 members/mm$^2$ with an average adhesion area per adhesive member of at most $1.25 \times 10^{-3}$ mm$^2$ so as to satisfy:

$$S_A/S_B = 2.5 \times 10^{-2} \text{ to } 1.0\%,$$

(wherein $S_A$ is the total adhesion area of the adhesion members and $S_B$ is the display area of the ferroelectric liquid crystal device).

2. A device according to claim 1, wherein the adhesive members are dispersed at a rate of 50 members/mm$^2$ or less.

3. A device according to claim 1, wherein non-adhesive members are disposed between the substrates.

4. A device according to claim 3, wherein said non-adhesive members are rigid members in the form of particles or rods.

5. A device according to claim 4, wherein said rods have a length l and a diameter d of from about 0.55 l to about 0.85 l.

6. A device according to claim 1, wherein said pair of substrates are spaced from each other with a spacing which suppresses the formation of the helical alignment structure of the ferroelectric liquid crystal.

7. A device according to claim 1, wherein at least one of the pair of substrates has an alignment control film disposed thereon.

8. A liquid crystal device, comprising:
a pair of parallel electrode plates, and
a ferroelectric liquid crystal, adhesive particles and spacer members disposed between the electrode plates, wherein said spacers are rods having a length of at most about 3 μm and are dispersed at from 5-100 spacers/mm$^2$, and wherein said rods have a length l and a diameter d of from about 0.55 l to about 0.85 l.

9. A device according to claim 8, wherein said adhesive particles provided a total adhesion area $S_A$ (mm$^2$) which is in the range of $2.5 \times 10^{-2}$ to 1.0% of the display area $S_B$ (mm$^2$) of the device.

10. A device according to claim 8, wherein said pair of electrode plates are spaced from each other with a spacing which suppresses the formation of the helical alignment structure of the ferroelectric liquid crystal.

11. A device according to claim 8, wherein at least one of the pair of electrode plates has an alignment control film disposed thereon.

* * * * *

UNITED STATES PATENT AND TRADEMARK OFFICE
CERTIFICATE OF CORRECTION

PATENT NO. : 5,054,890
DATED : October 8, 1991
INVENTOR(S) : YUKIO HANYU ET AL.

Page 1 of 3

It is certified that error appears in the above-identified patent and that said Letters Patent is hereby corrected as shown below:

TITLE PAGE:

AT [56] REFERENCES CITED

U.S. Patent Documents, insert
--4,712,875   12/1987   Tsuboyama et al. ......350/344
  4,740,060    4/1988   Komura et al. .........350/344--.

Foreign Patent Documents, insert
--0216632A2   4/1987   European Pat. Off. .....
  0050357A1   4/1982   European Pat. Off. ........--.

Insert
--Other Publications
  Patent Abstracts of Japan, unexamined applications,
  Vol. 12, No. 19 (1988), The Patent Office Japanese
  Government PG 57 P 657, Kokai-no. 62-174726.--.

AT [57] ABSTRACT

Line 9, "$S_A/S_B=2.5 \times 10^{-2}-1.0\%$," should read
--$S_A/S_B=2.5 \times 10^{-2}$ to $1.0\%$,--.

COLUMN 1

Line 41, "prosed" should read --proposed--.
Line 58, "degrade" should read --degrades--.

COLUMN 2

Line 15, "prolbmes." should read --problems.--.
Line 36, "$S_A/S_B=2.5 \times 10^{-2}-1.0\%$," should read
--$S_A/S_B=2.5 \times 10^{-2}$ to $1.0\%$,--.
Line 43, "paralled" should read --parallel--.

UNITED STATES PATENT AND TRADEMARK OFFICE
CERTIFICATE OF CORRECTION

PATENT NO. : 5,054,890
DATED : October 8, 1991
INVENTOR(S) : YUKIO HANYU ET AL.

It is certified that error appears in the above-identified patent and that said Letters Patent is hereby corrected as shown below:

COLUMN 3

Line 15, "rigid numbers" should read --rigid members--.
Line 46, "molecular layers 201" should read --molecular layers 204--.

COLUMN 5

Line 40, "adhesiveness," should read --adhesives,--.

COLUMN 6

Line 15, "below, the" should read --below. The--.

COLUMN 7

Line 12, "FIG. 3,    and   " should read --FIG. 3, o and ●--.
Line 13, "wherein    represents" should read --wherein ● represents--.
Line 14, "and    represents" should read --and o represents--.
Line 58, "following" should read --followed--.

COLUMN 8

Line 8, "seating," should read --sealing,--.

COLUMN 9

Line 29, "Iregularity" should read --Irregularity--.

UNITED STATES PATENT AND TRADEMARK OFFICE
CERTIFICATE OF CORRECTION

PATENT NO. : 5,054,890

DATED : October 8, 1991

INVENTOR(S) : YUKIO HANYU ET AL.

It is certified that error appears in the above-identified patent and that said Letters Patent is hereby corrected as shown below:

COLUMN 10

Line 38, "provided" should read --provide--.

Signed and Sealed this

Twentieth Day of July, 1993

Attest:

MICHAEL K. KIRK

Attesting Officer

Acting Commissioner of Patents and Trademarks